Figure 1:
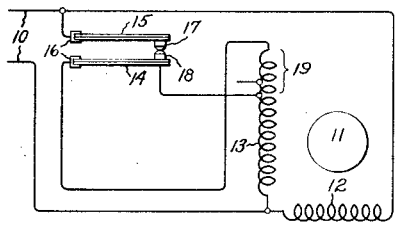

Oct. 3, 1939.  E. J. SCHAEFER  2,175,032

SINGLE PHASE MOTOR CONTROL

Filed July 30, 1937

Inventor:
Edward J. Schaefer,
by Harry E. Dunham
His Attorney.

Patented Oct. 3, 1939

2,175,032

UNITED STATES PATENT OFFICE 2,175,032

SINGLE PHASE MOTOR CONTROL

Edward J. Schaefer, Fort Wayne, Ind., assignor to General Electric Company, a corporation of New York Application July 30, 1937, Serial No. 156,510

5 Claims. (Cl. 172—279)

My invention relates to thermal control systems and apparatus for electric motors. The invention is intended primarily for controlling the starting switching operations of single-phase motors and to afford overload protection for such motors.

It is an important object of my invention to provide a noiseless, simple, low cost, yet reliable control switch and system for single-phase motors for disconnecting or otherwise modifying the starting winding circuit following the starting operation, which gives protection against burning out of the starting winding in case the motor should fail to start.

The features of my invention which are believed to be novel and patentable will be pointed out in the claims appended hereto. For a better understanding of my invention, reference is made in the following description to the accompanying drawing wherein several modifications of the invention are shown connected to the windings and source of supply of a single-phase motor. The thermal control switches of the modifications shown employ bimetallic contact strips, in most cases heated by current flowing through such strips. In Figs. 1, 2, 3, 8, and 9, one bimetallic strip of the switch is connected across a portion of the starting winding and is thus responsive to motor speed, as will be explained hereinafter. The modifications of Figs. 4, 5, 6, and 7 employs a double set of strips, one set being used for overload protection and the other set being provided for opening the starting winding circuit. The devices of Figs. 4, 5, and 6 employ a spring toggle element to assist in a quick make and break operation. The device of Fig. 7 employs a permanent magnet and that of Fig. 8 an electromagnet to modify their actions. The device of Fig. 9 is a differential switch in which the actions of two bimetallic strips are opposed.

Referring now to the drawing for a detail description, those parts which are similar in the different figures will be designated as far as possible by like reference characters. In all cases, 10 represents the line terminals for the motor and control system, and there will be any suitable line connecting switch, not shown, between the terminals 10 and the source of supply. 11 represents the motor rotor, 12 its main or running winding, and 13 the starting winding.

In Fig. 1, there is provided a thermal switch for cutting out the starting winding 13 after the motor comes up to speed. This switch comprises two bimetallic strips 14 and 15 fixed at 16 and having cooperating contact buttons 17 and 18 on their free ends. When heated by current flowing therein, strip 15 bends downward and strip 14 bends downward at a faster rate to open their contacts. It will be noted that the strips are connected in series relation through the contacts 17 and 18 in the circuit of the starting winding 13, also that the lower strip 14 is permanently connected across a small portion 19 of the starting winding. The main winding 12 of the motor is connected directly across the line terminals 10, and the starting winding 13 is connected in parallel with winding 12 to the line terminals but through the thermal switch described.

Normally, when no current is flowing through the strips 14 and 15, their contacts will be closed as shown. When the motor is energized, both windings 12 and 13 will receive current. The current of the starting winding flows through strip 15 and partially through strip 14, and these strips are designed with respect to the starting current of winding 13 to be heated under this starting condition to cause strip 15 to bend downward and strip 14 to bend downward more quickly to open the starting winding at contacts 17 and 18 by the time the motor comes up to normal speed. The opening operation is accomplished by strip 14 since it is designed with respect to the current flowing therein to flex more quickly than strip 15 under these conditions. When the starting winding circuit is thus opened and the motor has come up to speed, strip 15 cools again and returns to a normal position. However, strip 14 remains heated and in fact its heat usually increases due to the fact that it now receives current from portion 19 of the starting winding which now, since the motor is up to speed, has a voltage proportional to motor speed induced in it by transformer action from the main winding 12 through the revolving rotor. The switch thus remains open so long as the motor continues in normal single-phase operation on the main winding. If, now, the motor should be overloaded to the extent to cause it to stall or slow down materially, the induced voltage in the starting winding will drop and allow strip 14 to cool and close the starting winding circuit again. The switch thus has the advantage of the common centrifugal switch in reconnecting the motor for starting conditions in case the motor slows down or stops with or without the main windings being energized. However, it has other advantages, which the centrifugal switch does not have.

As is known, the starting windings of such motors are in many cases designed to be energized for not more than a few seconds and, if continuously energized for any length of time, it will burn out. This frequently happens when a centrifugal switch is used and the motor fails to start. With my thermal switch, the starting winding circuit is opened within a few seconds after the motor is energized even if the motor fails to start, and it thus affords a very desirable protection to the motor under such circumstances.

In some applications where noiseless operation is important, my starting switch is to be preferred over switches of the centrifugal type because no clicking noise accompanies its opening or closing operations. It is, moreover, of low cost, small in size, and may be mounted any place on or near the motor. By reason of the fact that both strips 14 and 15 bend in the same direction upon the application of heat the switch is self compensated for changes in ambient temperature. Another object that is accomplished by having both strips bend in the same direction with application of heat is to obtain some time delay after the contacts open under conditions where the motor is stalled. For example, assume that the motor has been running and is stalled by some overload which tends to hold the motor in the stalled condition. When the motor is stalled, strip 14 cools and moves upward to close the contacts. Immediately both strip 14 and 15 begin to bend downward. As previously explained, 14 bends fastest and the contacts open. Both strips begin to cool, but 14 is designed to cool more slowly than 15 with the result that there is appreciable time delay before 14 can overtake 15 and reclose the contacts.

Figure 2:
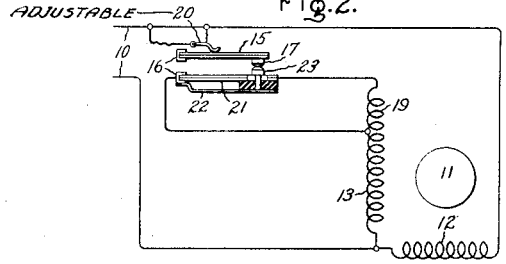

The unequal degree of heating of 14 and 15 may be secured by making 15 of a lower resistance than 14, by changing the top connection to winding 19 or by interchanging the connections between strip 14 and winding 19, or by changing the point at which the current is introduced into strip 14 as is done with strip 15, Fig. 2.

The rate of cooling of the two strips 14 and 15 may be controlled by designing the two strips for different rates of cooling. Interchanging the connections to coil 19 mentioned above has the effect of increasing current through 14 on starting without changing the running proportion.

The arrangement of Fig. 2 accomplishes the same purpose as that of Fig. 1 but may be adjusted to open the starting winding circuit at different speeds. To this end, the line connection to the upper bimetallic strip 15 comprises a spring clip 20 which may be adjusted along the strips to include any desired portion of its length in the starting winding circuit. As such portion is shortened, there is less total heating of the strip and, consequently, the opening of the switch may be adjusted to any desired extent by adjusting clip 20 towards contact 17. For any given motor and normal starting current, the exact speed at which the switch will open can thus be adjusted as desired and easily readjusted. In Fig. 2, the lower bimetallic strip 21 does not carry the starting winding current since it is insulated at its free end from contact 23 and this contact is connected to a high resistance but flexible heater strip 22. A small block of insulating material mechanically secures the strips 21 and 22 together at their free ends so that they move as a unit. The bimetallic strip 21 is initially heated by conduction from the resistance strip 22 through which the starting winding current flows when the switch is closed. This provides some thermal inertia with respect to the movement of the bimetallic strip 21 and assures that, at start, the switch will stay closed for the longest starting period for which the adjustable contact 20 may be adjusted and affords a greater time delay of reclosing under stalled motor condition. However, it also assures that if the safe starting period is exceeded due to failure of the motor to start, bimetallic strip 21 will flex downward and will open the starting winding circuit. The speed-responsive feature is retained since portion 19 of the starting winding is connected across bimetallic strip 21 and supplies heating current thereto, which maintains the switch open as long as the motor remains up to speed. As soon as the switch opens during a starting operation, the upper strip cools and returns its contact 17 to starting position, but contact 23 is returned to starting position to close the switch only after the motor has slowed down and the voltage supplied by portion 19 of the starting winding is no longer sufficient to send an operable heating current through strip 21.

Figure 3:
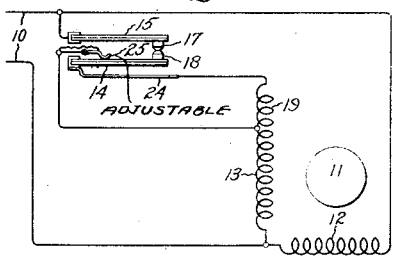

The arrangement of Fig. 3 is quite similar to that of Fig. 2 except that the connections are such that the starting current flows in and heats the lower bimetallic strip 14 and a separate high resistance heater strip 24 just below strip 14 is heated by the current supplied by portion 19 of the starting winding after the motor comes up to speed and retains strip 14 heated and flexed to open position by conduction until the motor slows down again.

In Fig. 3, I have also shown an adjustable spring clip 25 which may be slid along the lower bimetallic strip 14 to adjust the time heating characteristics thereof in the manner explained with respect to contact clip 20 of Fig. 2. Such adjustable feature may be applied to most of the other modifications described.

Figure 4:
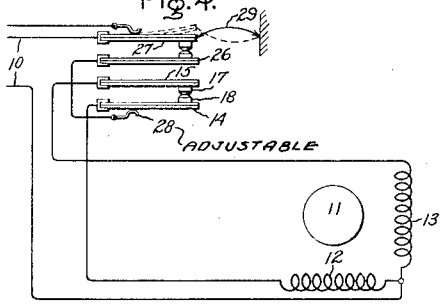

In Fig. 4, an additional pair of bimetallic contacts 26 and 27 is added to the switch for motor overload protection, and the extra connection to the starting winding has been dispensed with. The starting winding current enters the fixed end of strip 15, flows therethrough to the free end contact 17, enters strip 14 through contact 18, and leaves strip 14 at point 28, which may be adjustable to vary the relative heating effects of the main and starting winding currents on the thermal means for operating the starting switch. The starting current then flows through overload bimetallic strips 26 and 27 to the line terminal. The current from main winding 12 enters the fixed end of strip 14, leaves this strip at point 28, and from this point to the line terminal joins with the starting winding current in flowing through strips 26 and 27. A toggle spring 29 is preferably applied to the free end of strip 27 to cause a snap action and time delay of the contacts at the free ends of overload strips 26 and 27. When no current is flowing and the strips are cool, all contacts are closed as shown. When the motor is energized, strips 14 and 15 are heated and flex downward at different rates to open the starting winding circuit after the desired short time interval for the motor to reach running speed. While the motor is running normally, single-phase, the starting contacts 17 and 18 are held open by reason of the fact that the main winding current flows in and maintains strip 14 heated and flexed to open position.

The bimetallic strips 26 and 27 are heated and tend to flex upward, strip 26 tending to flex more slowly than strip 27 and they are then compensated for ambient temperature changes. However, they are designed not to open their contacts unless the current therethrough is in excess of normal and is maintained for a period appreciably longer than the normal starting period. Hence, the extra current therethrough during a normal starting period does not cause opening of the overload switch. However, if, for any reason, the starting contacts 17 and 18 fail to open or if a prolonged overload occurs, the overload strips 26 and 27 become sufficiently heated to open the motor circuit at their contacts. In such opening operation, the upper strip 27 is at first overpowered by the toggle spring 29 and hence tends to follow strip 26 downward slightly. As the heating of strip 27 increases, however, it overpowers the toggle spring and snaps to open position, as indicated in dotted lines. It will not snap back to closed position until it has cooled materially. Thus, the motor is protected against overload and the overload switch operates with a desirable snap action. In this arrangement, the starting winding switch at contacts 17 and 18 will not close in case the motor slows down due to overload until after the overload switch opens and allows strip 14 to cool because strip 14 is also traversed by the main winding current. As soon as the overload switch opens, however, the starting winding switch cools and will close more quickly than the overload switch. The line connection to strip 27 is shown adjustable for the purpose of adjusting the point of overload operation. The four bimetallic strips comprising the starting and overload switches are preferably mounted on a common supporting structure.

Figure 6:
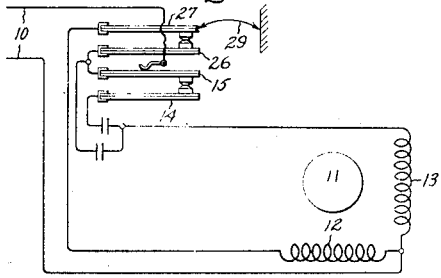

Fig. 6 is substantially the same as Fig. 4 except that the connections are such that, instead of breaking line current, the overload switch breaks only main winding current in case the motor is stalled or overloaded before the starting switch opens. The overload strips do not carry the starting winding current. As indicated in Fig. 6, the starting switch may be used to modify the connections of the starting winding circuit in other respects than simply opening it. In this case, the switch is employed to reduce the capacity in the starting winding circuit as the motor comes up to speed. This applies generally to the other modifications. In case the motor fails to start, nevertheless, the starting winding current is materially reduced when the starting switch opens and the starting winding is thus protected from a continuous heavy current.

Figure 5:
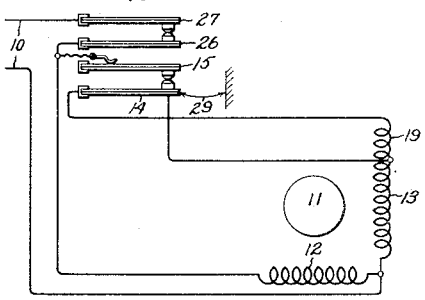

The scheme of Fig. 5 provides the overload strips 26 and 27 of Fig. 4 with the starting switch strips 14 and 15 but with strip 14 connected across a portion of the starting winding as in Fig. 1. As shown in Fig. 5, the snap action toggle 29 may be applied to the starting contact, if desired.

Figure 7:
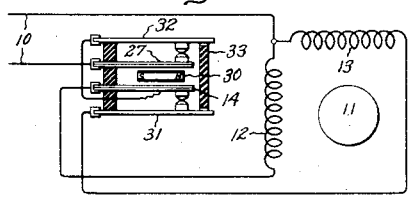

In Fig. 7, there is provided a small permanent magnet 30 to give snap action to the opening and closing of the contacts shown. The outer strips 31 and 32 are not bimetallic but are simply spring conductor strips, the free ends of which are biased to rest lightly against insulating stop 33. The inner strips 14 and 27 are bimetallic and at least one element of each is of magnetic material so as to be attracted by the permanent magnet 30. When cool, the contacts are closed as shown, the attraction of the permanent magnet being insufficient to overcome the bias of the strips 14 and 27 to their closed positions. Under these conditions, spring contact strips 31 and 32 may be sprung slightly away from the insulating stop 33 by the pressure exerted through the contacts from bimetallic strips 14 and 27. When the motor is energized, the starting winding current and the main winding current flowing in strip 14 heat the same quickly and cause this strip to tend to bend upward towards the permanent magnet 30.

The final stage of the opening of the starting winding by strip 14 occurs suddenly when magnetic strip 14 is pulled upward against the permanent magnet or rather against an insulating surface thereon. After opening its contact, strip 14 remains heated and in the open position by reason of the fact that the main winding current flows therein over a selected portion of its length.

The overload bimetallic magnetic strip 27 does not open its contact under normal starting and load conditions but, if the starting current to both motor windings is prolonged or if, after the starting winding has opened, the motor is overloaded for any length of time, strip 27 is heated sufficiently to snap over against the insulated surface of the permanent magnet to disconnect the motor and thus afford overload protection. When the motor is deenergized, the strips 14 and 27 cool and, when sufficiently cooled, their bias becomes sufficient to overcome the attraction of the permanent magnet and their contacts close with a snap action. The starting winding strip 14 closes its contact first under these conditions.

Figure 8:
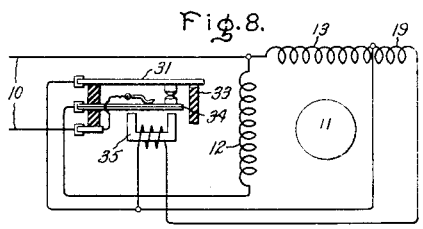
Figure 9:
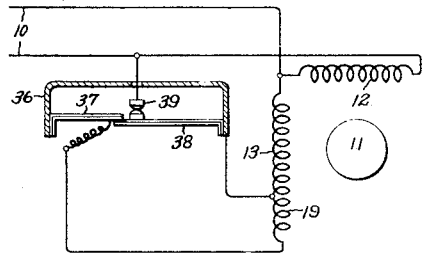

In Fig. 8, only one bimetallic strip 34 is used. The upper strip 31 may be a resilient conductor strip, that is biased to rest lightly against an insulating stop 33. When heated, strip 34 bends downward. It carries the current of both motor windings when the starting contacts controlled thereby are closed and, after these contacts open, strip 34 continues to carry the main winding current over an adjustable portion of its length. Strip 34 contains magnetic material and cooperates with an electromagnet 35, which is energized by being connected across the portion 19 of the starting winding. The contacts are normally closed when strip 34 is cool. When the motor is energized, strip 34 heats and tends to flex downward as the motor starts. The pull of the electromagnet increases as the motor comes up to speed and the starting winding circuit opens with a snap action. It remains open due to the reduced heating of strip 34 by the main winding current and the pull of the electromagnet. In case the motor stalls or is deenergized, the bimetallic magnetic strip is released and returns to close the starting winding circuit.

In Fig. 9, I have shown a metallic supporting structure 36 which supports bimetallic contact strips 37 and 38 and forms an electrical connection between their supported ends. The free ends of the strips extend toward each other. Strip 38 carries a contact at its free end which cooperates with a fixed contact 39. Strip 38, when cool, closes its contact against 39 and, when heated, tends to more firmly close these contacts. At its free end just beyond the contact, strip 38 carries a piece of insulating material on its upper surface against which the free end of bimetallic strip 37 rests. When heated, strip 37 bends downward and it is connected across the portion 19 of the motor starting winding. The starting winding 13 receives current through contact 39 when these contacts are closed and the motor is energized. This modification of the invention operates as follows:

The parts, when cool, are in the position shown with the starting winding closed. Upon energizing the motor, it starts and both strips 37 and 38 are heated to some extent and their actions with respect to opening the starting contacts are opposed. However, as the motor gains speed and the transformer voltage of the starting winding builds up, strip 37 heats at a faster rate than does strip 38 and hence strip 37 predominates over strip 38 and the contacts are opened. Strip 38 then cools and the contacts open wider. If the motor stalls or is deenergized, strip 37 cools and the contacts close again. This arrangement does not protect the starting winding against continuous energization in case the motor stalls and, if this arrangement is used, the starting winding should be designed to meet this possibility or be otherwise protected. Any connection which will increase the current in strip 37 faster than in strip 38 so as to obtain the desired differential heating action which varies with motor speed may be used. The differential effect of this type of thermal relay is very sensitive to a change in the current relations in the different strips because the heating effect is proportional to the square of the current. It is known that the starting winding current remains approximately constant throughout the starting period, whereas the current resulting from the transformer voltage of starting winding section 19 increases in proportion to the motor speed.

A variety of different modifications illustrating the principles of my invention have been described in connection with the control of the starting of single-phase motors. Other modifications of those described will occur to those skilled in the art. The combination or modification to be preferred in any particular case will vary and will depend upon the character of the motor installation.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. In combination with a single-phase motor having main and starting windings, a switch connectively associated with the starting winding for modifying the connections of the starting winding circuit between starting and running conditions, said switch comprising a pair of bimetallic thermal-responsive contact members normally in contact when cool but which bend relative to each other to open the switch when heated, said members being included in the starting winding circuit so as to be heated by the current flowing therein, means for adjusting the time heating characteristics of said switch by such current to adjust for the starting period of such motor, and connections which are independent of the opening of said switch for supplying a heating current to said switch proportional to motor speed.

2. In combination with a single-phase motor having main and starting windings and circuits therefor, a thermal switch mechanism having overload contacts included in the circuit to both windings and contacts for opening only the starting winding circuit, bimetallic thermal-responsive contact means responsive to the total motor current for opening the overload contacts, bimetallic thermal-responsive contact means responsive to the current in the starting winding for opening the starting winding circuit contacts, and means for supplying a heating current to the last mentioned bimetallic means independently of the opening of the starting winding circuit when the motor is in normal operation, said two bimetallic means being so proportioned with respect to each other and to their heating currents that the overload contacts do not open under normal starting current conditions but the starting winding contacts open promptly when the motor comes up to speed and the overload contacts open only under prolonged starting and overload conditions.

3. In combination with a single-phase motor having main and starting windings, a mechanism for controlling said motor including an overload switch and a starting switch, the overload switch being connected in circuit with both windings and the starting switch being connected in circuit with the starting winding only, said switches each including a bimetallic thermal-responsive magnetic contact member included in their respective circuits, a permanent magnet lying between said members, said members being biased to close their switches when cool and to flex toward the permanent magnet to open their switches when heated, the permanent magnet serving to assist in the opening actions, to impede the closing actions, and to produce a snap action opening and closing of said switches as their bimetallic members are heated and cooled, and connections whereby the thermal-responsive member of the starting switch is heated to prevent its closing when the motor is in normal operation as a single-phase motor.

4. In combination with a single-phase motor having main and starting windings, a switch for controlling the circuit connections of the starting winding between starting and running conditions, said switch including a pair of bimetallic thermal-responsive means which control the opening and closing actions of the switch, one of said members, upon being heated, tending to close the switch and the other member, upon being heated, tending to open the switch such that the operation of the switch is determined by the differential action of said members, the switch being closed when both members are cool, and connections to said motor for conveying heating currents to said members such that the heating current of the member which tends to open the switch when heated increases at a greater rate than the heating current of the other member during the starting period of the motor, whereby said switch is opened.

5. In combination, a single-phase motor having main and starting windings, a switch having a pair of bimetallic thermal-responsive switch-operating members for opening and closing the switch, said bimetallic members, when heated and cooled, operating differentially with respect to the opening and closing operations of the switch, said switch being connected to produce a change in the starting winding circuit connections of the motor when the switch is operated from closed to open position and vice versa, and connections between said motor and members for conveying heating currents to said members when the motor is energized for starting, said connections being such that the heating current to one member increases materially with respect to the heating current to the other member as the motor increases in speed whereby the switch is operated in response to motor speed, such operation of said switch serving to open the heating circuit of only that member which opposed such switch operation.

EDWARD J. SCHAEFER.